(12) United States Patent
Pei et al.

(10) Patent No.: US 10,057,388 B2
(45) Date of Patent: Aug. 21, 2018

(54) SYSTEM AND METHOD FOR SELECTING A COMMUNICATION NETWORK IN A SENSOR NETWORK

(71) Applicant: The Boeing Company, Chicago, IL (US)

(72) Inventors: Guangyu Pei, Issaquah, WA (US); Anil Kumar, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 56 days.

(21) Appl. No.: 14/809,829

(22) Filed: Jul. 27, 2015

(65) Prior Publication Data

US 2017/0034316 A1 Feb. 2, 2017

(51) Int. Cl.
| H04L 29/06 | (2006.01) |
| H04W 48/18 | (2009.01) |
| H04B 3/54 | (2006.01) |
| H04L 12/24 | (2006.01) |
| H04W 4/70 | (2018.01) |
| H04W 84/18 | (2009.01) |
| H04W 88/06 | (2009.01) |
| H04L 29/08 | (2006.01) |

(52) U.S. Cl.
CPC ............... *H04L 69/18* (2013.01); *H04B 3/54* (2013.01); *H04L 41/0856* (2013.01); *H04W 48/18* (2013.01); *H04L 67/12* (2013.01); *H04W 4/70* (2018.02); *H04W 84/18* (2013.01); *H04W 88/06* (2013.01)

(58) Field of Classification Search
None
See application file for complete search history.

(56) References Cited

U.S. PATENT DOCUMENTS

| 6,563,418 | B1 | 5/2003 | Moon |
| 8,836,467 | B1* | 9/2014 | Cohn ................... G08B 25/003 |
| | | | 340/3.32 |
| 2004/0111494 | A1* | 6/2004 | Kostic ............... H04L 29/12216 |
| | | | 709/220 |
| 2005/0063355 | A1* | 3/2005 | Iwamura ................ H04B 3/542 |
| | | | 370/351 |

(Continued)

FOREIGN PATENT DOCUMENTS

KR 2013 0064310 6/2013

OTHER PUBLICATIONS

Texas Instruments: "TI Designs RF Sensor Node Development Platform for 6LoWPAN and 2.4 GHz Applications Featured Applications TPS72733", (Mar. 31, 2014), XP055326719.

(Continued)

*Primary Examiner* — Steven H Nguyen
(74) *Attorney, Agent, or Firm* — Vivacqua Law

(57) ABSTRACT

A sensor network is disclosed, and includes a first network based on a wireless communication protocol, a second network based on a power line communication protocol, and at least one sensor node in communication with one of the first network and the second network. The sensor node includes at least one sensor and a control module in communication with the at least one sensor. The control module includes control logic for selecting one of the first network and the second network based on at least one operating parameter of the sensor network.

19 Claims, 3 Drawing Sheets

(56) References Cited

U.S. PATENT DOCUMENTS

| | | | | |
|---|---|---|---|---|
| 2005/0065742 A1* | 3/2005 | Rodgers | G01D 4/004 | 702/62 |
| 2005/0085259 A1* | 4/2005 | Conner | H04B 3/542 | 455/552.1 |
| 2007/0177623 A1* | 8/2007 | Logvinov | H04L 12/2838 | 370/463 |
| 2009/0007156 A1* | 1/2009 | Baek | H04L 12/2803 | 719/328 |
| 2010/0109862 A1* | 5/2010 | Sharma | H04B 3/542 | 340/538 |
| 2011/0182296 A1* | 7/2011 | Anschutz | H04L 12/2898 | 370/401 |
| 2012/0218120 A1* | 8/2012 | Ree | H04Q 9/00 | 340/870.02 |
| 2012/0229296 A1* | 9/2012 | Ree | G01D 4/002 | 340/870.02 |
| 2012/0263066 A1* | 10/2012 | Hurwitz | H04L 12/413 | 370/252 |
| 2013/0132603 A1* | 5/2013 | Cohen | H04L 1/1841 | 709/231 |
| 2013/0201316 A1* | 8/2013 | Binder | H04L 67/12 | 348/77 |
| 2014/0376405 A1* | 12/2014 | Erickson | H04W 52/0212 | 370/254 |

OTHER PUBLICATIONS

Texas Instruments: "Robust Sensor Networks With Hybrid PLC/ RF Nodes", Video (Feb. 6, 2012), Retrieved from the Internet: URL: http://www.ti.com/general/docs/video/watch.tsp?entryid=0 z91slcop.

"IEEE Standard for Low-Frequency (less than 500 kHz) Narrowband Power Line Communications for Smart Grid Applications; IEEE Std 1901.2-2013", (Dec. 6, 2013), XP068055829, ISBN: 978-0-7381-8793-8.

José Cecilio et al.: "Chapter 2, Wireless Sensor Networks: Concepts and Components" In: "Wireless Sensors in Heterogeneous Networked Systems", (Jan. 1, 2014), Springer International Publishing, Cham, XP055326943, ISBN: 978-3-319-09280-5, pp. 5-25.

Cedric Chauvenet et al.: "PLC sensor IPv6 networking interoperable with WSN", (May 4, 2010), pp. 1-17, XP055326284; Retrieved from the Internet: URL: https://www.researchgate.net/publication48414176_PLC_sensor_IPv6_networking_interoperabe_with_WSN.

EP, Extended European Search Report and Opinion; Patent Application No. 16174010.5; 11 pages (Dec. 20, 2016).

EP, Office Action; European Patent Application No. 16174010.5; 8 pages (dated Nov. 21, 2017).

* cited by examiner

SYSTEM AND METHOD FOR SELECTING A COMMUNICATION NETWORK IN A SENSOR NETWORK

FIELD

The disclosed system relates to a flexible network system for an aircraft and, more particularly, to a system and method for selecting either a first sensor network based on a wireless communication protocol or a second sensor network based on a power line communication protocol.

BACKGROUND

An aircraft may include various of sensors for flight control and various operations. The sensors may be part of an aircraft sensor network for sending data collected by the sensors to computing systems that may analyze the data collected by the sensors. For example, an environmental control system for a passenger cabin in an aircraft may use various temperature sensors and airflow sensors to identify changes that may be needed to maintain a desired environment in the passenger cabin.

It should be appreciated that an increased use of aircrafts sensors results in more wiring within an aircraft. The wiring may add cost and weight to the aircraft, and may also be time consuming to install. In order to reduce the wiring within the aircraft, a wireless sensor network may be used. However, implementing wireless networks on an aircraft may present several unique challenges. Some examples of the issues encountered when attempting to implement a wireless network within an aircraft include, for example, power and battery constraints, radio frequency (RF) channel impairments, security, and physical to logical mapping. In particular, existing wireless solutions are not always secure when subjected to interference due to the inherent nature of wireless mediums. Furthermore, it should also be appreciated that accurate physical to logical mapping of wireless nodes may not be accomplished unless there is a high amount of bandwidth available. Thus, there exists a continuing need in the art for a robust, flexible wireless sensor network that overcomes the issues described above.

SUMMARY

In one aspect, a sensor network is disclosed, and includes a first network based on a wireless communication protocol, a second network based on a power line communication protocol, and at least one sensor node in communication with one of the first network and the second network. The sensor node includes at least one sensor and a control module in communication with the at least one sensor. The control module includes control logic for selecting one of the first network and the second network based on at least one operating parameter of the sensor network.

In another aspect, a method of selecting one of a first network and a second network within a sensor network of an aircraft is disclosed. The method includes detecting, by a control module, at least one operating parameter of the sensor network. The method also includes selecting, by the control module, one of the first network and the second network based on the at least one operating parameter of the sensor network. The first network is based on a wireless communication protocol, the second network is based on a power line communication protocol, and the control module is part of at least one sensor node in communication with one of the first network and the second network.

Other objects and advantages of the disclosed method and system will be apparent from the following description, the accompanying drawings and the appended claims.

DETAILED DESCRIPTION

Figure 1:
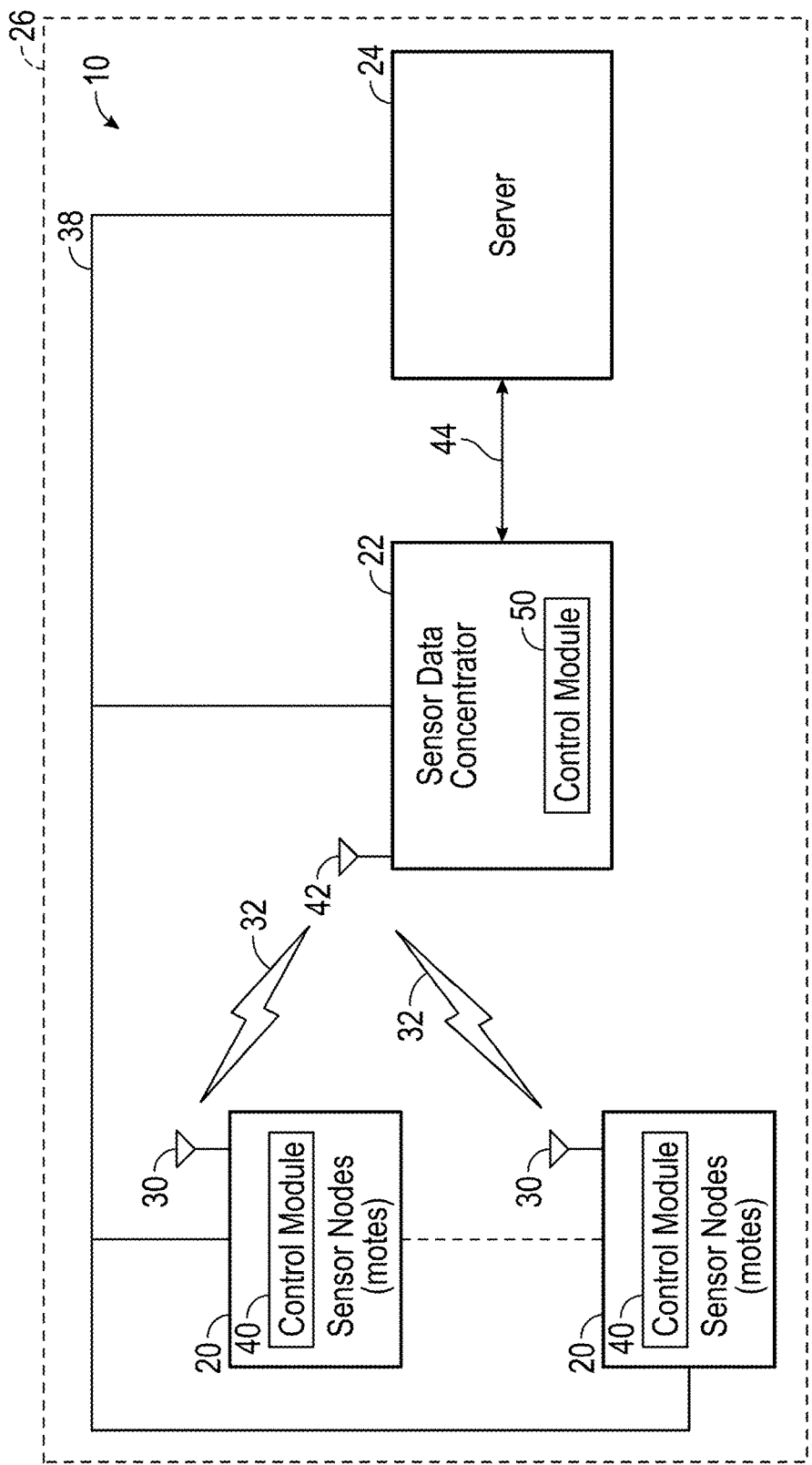
FIG. 1 is a block diagram of the disclosed sensor network including a plurality of sensor nodes, a data collector, and a server.

FIG. 1 is a block diagram illustrating the disclosed sensor network 10. The sensor network 10 may include one or more sensor nodes 20 (which may also be referred to as motes), a data concentrator 22, and a server 24. The sensor network 10 may be a hybrid network that includes two different communication protocols for transmitting data collected by the sensor nodes 20 to the server 24. Specifically, as explained in detail below, the sensor network 10 provides a robust, flexible network for communicating data gathered by the sensor nodes 20 using either a wireless network or a power line communication. Furthermore, as also explained in greater detail below, if one of the networks is unavailable, then the sensor network 10 may easily switch over to the remaining network for uninterrupted data communication service.

In the embodiment as illustrated in FIG. 1, the sensor network 10 is part of an aircraft 26. However, it is to be appreciated that the sensor network 10 is not limited to an aircraft 26 and may be used in other environments as well such as, for example, automotive applications. Although the aircraft 26 is not intended to be limiting in nature, it should be appreciated that aircraft networks generally do not require relatively fast data transmission rates. Therefore, as explained below, the wireless medium as well as a power line communication may each be based on a communication protocol having relatively low data transmission rates.

Each of the sensor nodes 20 may include a respective antenna 30, and each sensor node 20 may be in communication with the remaining sensor nodes 20 as well as the data concentrator 22 through a wireless connection 32. The wireless connection 32 may be based on a radio frequency (RF) communication protocol. In one embodiment, the wireless connection 32 may be based on a RF communication protocol having a relatively low data transmission rate with a transmission rate on the order of hundreds of kilobites/second. One example of a RF communication protocol having a relatively low data rate is a communication protocol based on the Institute of Electrical and Electronics Engineers (IEEE) 802.15.4 protocol. It should also be appreciated that the IEEE 802.15.4 protocol only defines the lower network layers of a seven-layer Open Systems Interconnect (OSI) model, such as a physical (PHY) layer as well as a media access control (MAC) layer. The PHY layer may be referred to as layer 1, and is the lowest layer in the network layers. The MAC layer may be referred to as layer 2. It should further be appreciated that higher-level layers are not defined by the IEEE 802.15.4 protocol. Some examples of wireless communication protocols that are based on the IEEE 802.15.4 protocol include, but are not limited to, ZigBee®, WirelessHART®, and 6LoWPAN.

Each of the sensor nodes 20 may be in communication with one another as well as the data concentrator 22 and the server 24 through a power line communication 38. The power line communication 38 may also be based on a communication protocol having relative low data transmission rates such as, for example, narrow-band power line communications. In one non-limiting embodiment, the power line communication 38 may be based on the IEEE 1901.2 protocol. It is to be understood that a narrow-band power line communication typically operates at frequency bands below about 500 kiloHertz (kHz). It is to be appreciated that the power line communication 38 should not be limited to only narrow-band power line communication, however, narrow-band communication may provide reduced interference with other system located on the aircraft 26. Furthermore, it should also be appreciated that in one embodiment the power line communication 38 may utilize either existing alternating current (AC) or direct current (DC) power lines within the aircraft 26, which in turn reduces the cost and weight of the aircraft 26. Specifically, for example, the power line communication 38 may utilize an existing 115 VAC line, or an existing 28 VDC line within the aircraft 26.

Figure 3:
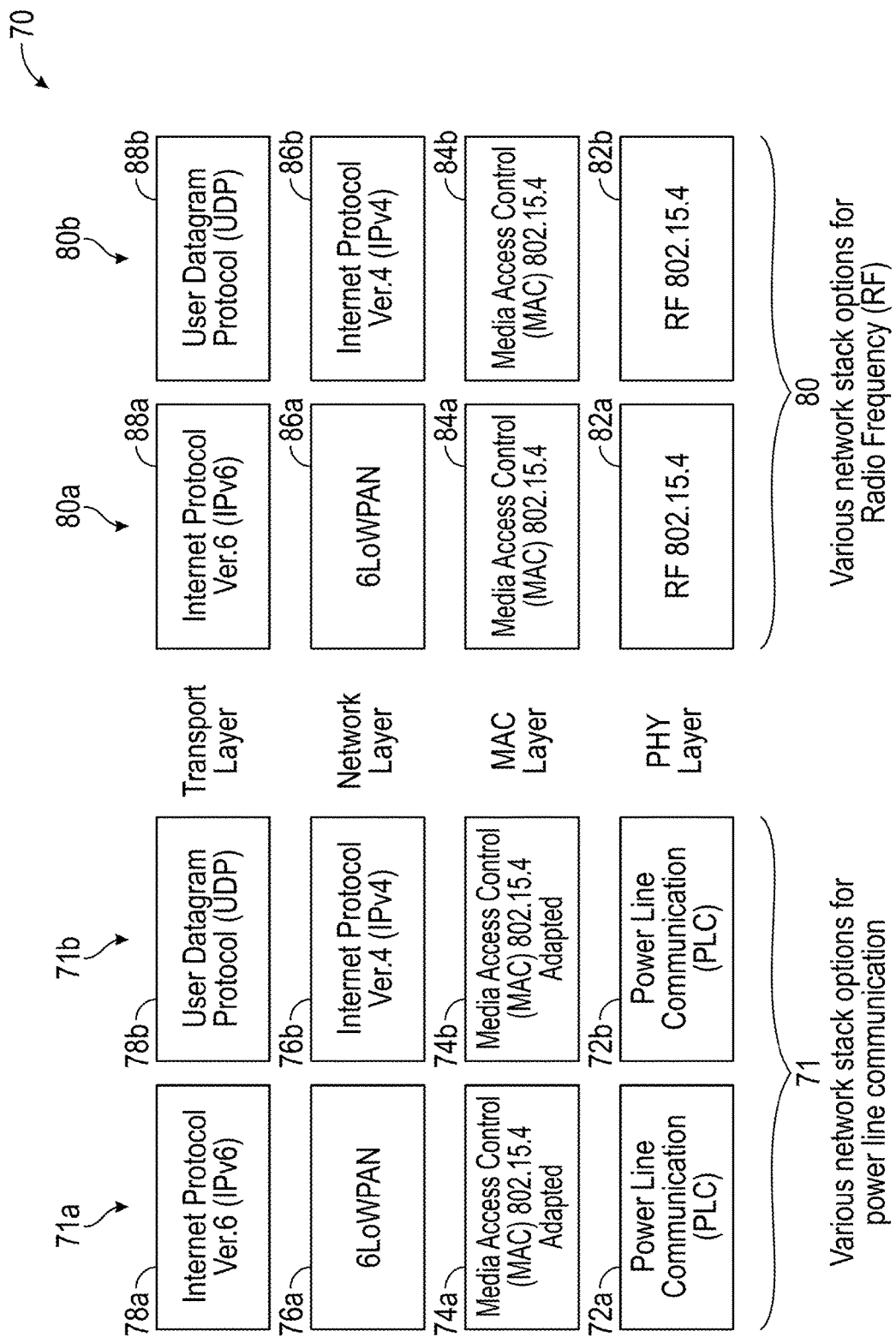
FIG. 3 is a block diagram of the various stack options saved in a memory of the control modules shown in FIGS. 1-2.

The sensor nodes 20 may include one or more sensors (not illustrated) for gathering sensory information indicative of operating conditions within the aircraft 26 such as, for example, temperature, pressure, speed, and altitude. The sensor nodes 20 may also process the sensory information gathered by the sensors by a respective control module 40. The control module 40 may both refer to, or be part of, an application specific integrated circuit (ASIC), an electronic circuit, a combinational logic circuit, a field programmable gate array (FPGA), a processor (shared, dedicated, or group) comprising hardware or software that executes code, or a combination of some or all of the above, such as in a system-on-chip. The control module 40 may include multiple stack configurations saved in memory for communication with both the wireless connection 32 and the power line communication 38, which is explained in greater detail below and is illustrated in FIG. 3. The sensor nodes 20 may transmit data indicative of the operating conditions detected by the sensors to other sensor nodes 20 within the sensor network 10, as well as to the data concentrator 22 through either the wireless connection 32 or the power line communication 38.

The data concentrator 22 may include an antenna 42. The wireless connection 32 connects the sensor nodes 20 to the data concentrator 22 through the respective antennas 30, 42. The data concentrator 22 may collect the data from the sensor nodes 20, and may transmit the data received from the sensor nodes 20 to the server 24 over a data connection 44. The connection 44 may be any type of connection for transmitting data such as, for example, an Ethernet connection. The data concentrator 22 may include at least one control module 50 for transmitting the data received from the sensor nodes 20 to the server 24. The control module 50 may include multiple stack configurations saved in memory for communication with both the wireless connection 32 and the power line communication 38, which is explained in greater detail below and is illustrated in FIG. 3. Both the control modules 40 and the control module 50 may include control logic for selecting communication based on either the wireless connection 32 or the power line communication 38.

Figure 2:
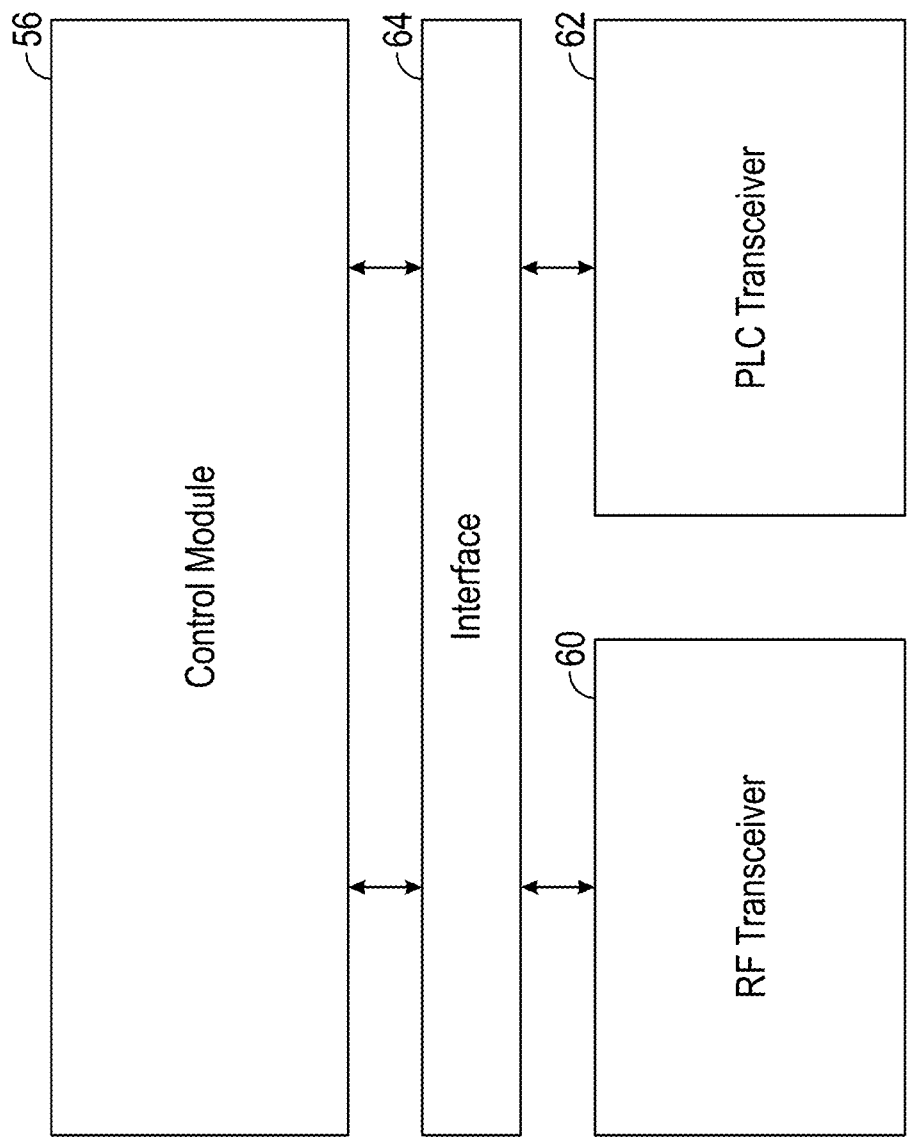
FIG. 2 is a block diagram of a control module shown in FIG. 1.

FIG. 2 is a block diagram of the control module 50 in communication with two transceivers 60, 62 through an interface 64. Specifically, one of the transceivers 60 is an RF transceiver that is in communication with the wireless connection 32 (FIG. 1). The RF transceiver 60 is for sending and receiving communication from the wireless connection 32. The remaining transceiver 62 may be a power line communication (PLC) transceiver that is in communication with the power line communication 38 (FIG. 1). The PLC transceiver 62 is for sending and receiving communication from the power line communication 38.

Both the RF transceiver 60 and the PLC transceiver 62 are both in communication with the interface 64. The interface 64 may be, for example, an enhanced serial peripheral interface (SPI) based on the IEEE 802.15.4 protocol. It should be appreciated that the SPI interface is common between both the RF transceiver 60 and the PLC transceiver 62. The interface 64 may transmit communication from the RF transceiver 60 and the PLC transceiver 62 to the control module 50.

FIG. 3 is an exemplary network stack configuration 70 saved within memory of the control module 50 (FIGS. 1 and 2), as well as within a memory of the control modules 40 (shown in FIG. 1). Specifically, the stack 70 includes a first, power line communication stack 71 and a second, wireless connection stack 80. The power line communication stack 71 may include one or more stack options for communication with the PLC transceiver 62 shown in FIG. 2. In the exemplary embodiment as illustrated, the power line communication stack 71 includes two stacks 71a, 71b that are each based on the OSI model. However, it is to be appreciated that this illustration is not limiting, and in another embodiment the network stack configuration 70 may be based on another protocol as well such as Zigbee Stack®.

FIG. 3 illustrates the power line communication stack 71a including a plurality of layers, namely a PHY layer 72a, a MAC layer 74a, a network layer 76a, and a transport layer 78a. Similarly, the power line communication stack 71b is shown including a PHY layer 72b, a MAC layer 74b, a network layer 76b, and a transport layer 78b. It is to be appreciated that the top three layers of the two stacks 71a, 71b, namely the session layer, the presentation layer, and the application layer, are not illustrated in FIG. 3 for purposes of simplicity and clarity. However, the power line communication stacks 71a, 71b both include these layers.

As readily understood by those of ordinary skill in the art, the PHY layers 72a, 72b may receive and transmit messages to and from a physical medium. The physical medium may be a sensor modules (not illustrated) of the sensor nodes 20 shown in FIG. 1, if the network stack configuration 70 is saved within memory of the control module 40. Alternatively, the physical device may also be the PLC transceiver 62 (FIG. 2), if the network stack configuration 70 is saved within memory of the control module 50. The MAC layers 74a, 74b may act as an interface between the network layers 76a, 76b and the PHY layers 72a, 72b. As can be seen in FIG. 3, the MAC layers 74a, 74b are both adapted to the IEEE 802.15.4 protocol. It is to be appreciated that the IEEE 802.15.4 protocol is not intended for power line communication. Thus, the MAC layers 74a, 74b have been adapted or modified in order for power line communication. The network layers 76a, 76b and the transport layers 78a, 78b may be considered higher layers than the PHY layer 72 and the MAC layer 74, as data from the PLC transceiver 62 may travel up through the stack, from the respective PHY layers 72a, 72b to the application layer (not illustrated). The data may then be sent over the power line communication 38, if the network stack configuration 70 is saved within memory of the control module 40. If the network stack configuration 70 is saved within memory of the control module 50, then data may be sent over the connection 44 and to the server 24 (FIG. 1).

In the exemplary embodiment as shown in FIG. 3, the network layer 76a may be provided for communication based on the 6LoWPAN protocol. Specifically, the network layer 76a may send data packets based on Internet Protocol version 6 (IPv6) to the transport layer 78a. Likewise, the network layer 76b may be provided or communication based on Internet Protocol version 4 (IPv4). The network layer 76b may send data packets based on the User Datagram Protocol (UDP) to the transport layer 78b. It should be appreciated that FIG. 3 is merely exemplary in nature, and that the network layers 76a, 76b and the transport layers 78a, 78b may be based on another protocol as well. It should also be appreciated that although the power line communication stack 71 includes two stacks 71a, 71b, this illustration is merely exemplary in nature, and any number of stacks for accommodating other types of communication protocols may be included as well.

Continuing to refer to FIG. 3, the wireless connection stack 80 may include one or more stack options for communication with the RF transceiver 60 shown in FIG. 2. In the embodiment as illustrated, the wireless connection stack 80 includes two stacks 80a, 80b. Specifically, FIG. 3 illustrates the wireless connection stack 80a including a PHY layer 82a, a MAC layer 84a, a network layer 86a, and a transport layer 88a. Similarly, FIG. 3 illustrates the wireless connection stack 80b including a PHY layer 82b, a MAC layer 84b, a network layer 86b, and a transport layer 88b. It is to be appreciated that the top three layers of the two stacks 80a, 80b, namely the session layer, the presentation layer, and the application layer, are also not illustrated in FIG. 3 for purposes of simplicity and clarity.

The PHY layers 82a, 82b may receive and transmit messages to and from a physical device. The physical device may be the sensors (not illustrated) of the sensor nodes 20 shown in FIG. 1, if the network stack configuration 70 is saved within memory of the control module 40. Alternatively, the physical device may also be the RF transceiver 60 (FIG. 2), if the network stack configuration 70 is saved within memory of the control module 50. Similar to the network layer 76a of the power line stack 70a, the network layer 86a of the wireless connection stack 80a may be provided for communication based on 6LoWPAN. Likewise, the network layer 86b of the wireless connection stack 80b may be based on IPv4.

Referring to both FIGS. 1 and 3, both the control modules 40, 50 may each include control logic for selecting either the power line communication stack 71 or the wireless connection stack 80 of the network stack configuration 70. The selection of the specific stack may be based on at least one operating parameter of the sensor network 10. Specifically, the selection of the specific stack may be based on if one or more layers (i.e., the PHY layer, the MAC layer, the network layer, the transport layer, the session layer, the presentation layer, and the application layer) of the network stack configuration 70 are unavailable. It is to be appreciated that in one embodiment, the wireless connection stack 80 may be a default stack that is utilized unless the wireless connection 32 (FIG. 1) is unavailable, or if highly secure data not suitable for transmission over a wireless network is to be communicated over the sensor network 10 (FIG. 1). For example, if the control module 50 receives communication or determines there is jamming or another channel impairment that may affect the PHY layers 82a, 82b of the wireless connection stack 80, then the control module 50 would select the power line communication stack 71 for data transmission.

In one approach, after the control modules 40, 50 select either the power line communication stack 71 or the wireless connection stack 80 of the network stack configuration 70 based on the availability of the PHY layers 72a, 72b, 82a, 82b, then the control modules 40, 50 may select a specific stack within either the power line communication stack 71 or the wireless connection stack 80. The selection of the specific stack may be based on the communication protocols defined by the higher level layers of the stacks. It is to be appreciated that the higher level layers include the five layers above the MAC layer (i.e., the network layer, the transport layer, the session layer, the presentation layer, and the application layer). For example, if the control modules 40, 50 receive communication or determines that the sensor network 10 (FIG. 1) is transmitting voice data, then it is to be appreciated that UDP, which is defined by the transport layer, may be utilized. Thus, if the power line communication stack 71 has already been selected, then the power line communication stack 71b is selected by the control module 50. Similarly, if the wireless connection stack 80 has already been selected, then the wireless connection stack 80b is selected by the control module 50.

It is to be appreciated that the control modules 40 (FIG. 1) include similar control logic as the control module 50 for selection of one of the stacks within the network stack configuration 70. However, it is to be appreciated that the control module 50 may implement additional functionalities to coordinate various associated sensor nodes 20 such as, for example, network formation and security key management.

Referring generally to the figures, the disclosed sensor network 10 provides a hybrid network that includes both a wireless connection as well as a power line communication for communication. It is to be appreciated that the power line communication may utilize either existing AC or DC power lines within the aircraft 26, thereby reducing the cost and weight associated with hard-wired connections. It should also be appreciated that the disclosed approach for selecting a specific network stack utilizing existing hardware within the control modules 40, 50. Finally, it is to be appreciated that an aircraft power system includes a unique challenges, such as loads and signal propagation environments. Therefore, it may be especially advantageous to utilize narrow-band power line communication, which provides reduced interference with other systems located on the aircraft.

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. A sensor network for selecting one of a wireless connection and a wired connection, the sensor network comprising:
   a server;
   a sensor data concentrator connected to the server;
   a first network based on a wireless communication protocol;
   a second network based on a power line communication protocol connected to the sensor data concentrator and to the server;
   the sensor data concentrator having a first control module including a first memory storing at least one power line stack based on the power line communication protocol, and at least one wireless stack based on the wireless communication protocol, wherein the at least one power line stack includes a first media access (MAC) layer and the at least one wireless stack includes a second MAC layer, wherein the first MAC layer and the second MAC layer both conform to the wireless communication protocol; and at least one sensor node in communication with the sensor data concentrator over both the first network and the second network, and with the server over the second network, the at least one sensor node including at least one sensor and a second control module in communication with the at least one sensor, the second control module including control logic for selecting either the first network or the second network to communicate with the sensor data concentrator over the first and the second network, and with the server over the second network, wherein selection of the first or the second network by the first and the second control modules is based on at least one operating parameter of the sensor network, wherein the first network is a default connection that is used unless the control module transmits secure data.

2. The sensor network of claim 1, wherein the at least one wireless stack and the at least one power line stack are both based on a seven-layer Open Systems Interconnect (OSI) model, and wherein both the at least one wireless stack and the at least one power line stack each include a plurality of layers.

3. The sensor network of claim 2, wherein the at least one operating parameter is based on whether a specific layer of the plurality of layers of either the at least one wireless stack or the at least one power line stack is unavailable.

4. The sensor network of claim 2, wherein the at least one operating parameter is whether a physical (PHY) layer of the at least one wireless stack or the at least one power line stack is unavailable.

5. The sensor network of claim 2, wherein the at least one operating parameter is based on a higher level layer of the at least one wireless stack or the at least one power line stack.

6. The sensor network of claim 1, wherein the wireless communication protocol is based on an Institute of Electrical and Electronics Engineers (IEEE) 802.15.4 protocol.

7. The sensor network of claim 1, wherein the power line communication protocol is a narrow-band power line communication that operates at frequency bands below about 500 kiloHertz (kHz).

8. The sensor network of claim 1, wherein the power line communication protocol utilizes one of an existing alternating current (AC) power line and an existing direct current (DC) power line within an aircraft.

9. The sensor network of claim 1, wherein the data concentrator is in communication with the server over a data connection, optionally an Ethernet connection.

10. The sensor network of claim 9, wherein the second control module includes a second memory storing at least one power line stack based on the power line communication protocol, and at least one wireless stack based on the wireless communication protocol, wherein the at least one power line stack includes a first media access (MAC) layer and the at least one wireless stack includes a second MAC layer, and wherein the first MAC layer and the second MAC layer both conform to the wireless communication protocol.

11. The sensor network of claim 9, wherein a network stack configuration of the second control module is saved within the second memory of the second control module.

12. The sensor network of claim 1, further comprising an interface that connects the first network based on the wireless communication protocol and the second network based on the power line communication protocol with the control module.

13. The sensor network of claim 12, wherein the interface is an enhanced serial peripheral interface (SPI) based on an IEEE 802.15.4 protocol.

14. A method of selecting one of a first network and a second network within a sensor network of an aircraft, the first network being a wireless protocol network connected between a sensor node and a sensor data concentrator, and the second network being a power line communication protocol network connected between the sensor node and the sensor data concentrator and between the sensor node and a server, the method comprising:

detecting, by a first control module in the sensor data concentrator, at least one operating parameter of the sensor network, wherein the first network is a default connection that is used unless the control module transmits secure data, in which the first control module includes a memory storing at least one power line stack based on a power line communication protocol and at least one wireless stack based on a wireless communication protocol, and the at least one power line stack includes a first media access (MAC) layer and the at least one wireless stack includes a second MAC layer, and wherein the first MAC layer and the second MAC layer both conform to the wireless communication protocol; and selecting, by the first control module, either the first network or the second network based on the at least one operating parameter of the sensor network, wherein the sensor node communicates with the sensor data concentrator over the first network based on the wireless communication protocol, the sensor node communicates with the sensor data concentrator and with the server over the second network based on the power line communication protocol, and the first control module is part of at least one sensor node in communication with the first network and the second network.

15. The method of claim 14, wherein the at least one wireless stack and the at least one power line stack are both based on a seven-layer Open Systems Interconnect (OSI) model, and wherein both the at least one wireless stack and the at least one power line stack include a plurality of layers.

16. The method of claim 14, comprising selecting one of the first network and the second network based on the at least one operating parameter of the sensor network by a second control module, wherein the data concentrator is in communication with one of the first network and the second network, and the data concentrator includes a second control module.

17. The method of claim 14, wherein the wireless communication protocol is based on an IEEE 802.15.4 protocol.

18. The method of claim 14, comprising connecting the first network based on the wireless communication protocol and the second network based on the power line communication protocol with the control module by an interface.

19. The method of claim 18, wherein the interface is an enhanced serial peripheral interface (SPI) based on an IEEE 802.15.4 protocol.

* * * * *